United States Patent [19]

Melville

[11] Patent Number: 4,857,697
[45] Date of Patent: Aug. 15, 1989

[54] CONTINUOUS SEAM WELDING APPARATUS AND METHODS

[75] Inventor: Martin J. Melville, Sparsholt, England

[73] Assignee: Metal Box Public Limited Company, Reading, United Kingdom

[21] Appl. No.: 144,267

[22] Filed: Jan. 15, 1988

[30] Foreign Application Priority Data

Jan. 21, 1987 [GB] United Kingdom ............... 8715548

[51] Int. Cl.$^4$ ............................................. B23K 26/00
[52] U.S. Cl. ........................... 219/121.63; 219/121.8; 219/121.76
[58] Field of Search .... 219/121 LC:121 CD, 121 LS, 219/121 LT, 121 LQ, 121 LR, 121 LW, 121 LU, 121 LG, 121 LN

[56] References Cited

U.S. PATENT DOCUMENTS

| | | | |
|---|---|---|---|
| 4,564,739 | 1/1986 | Mattelin | 219/121 LT X |
| 4,649,256 | 3/1987 | Minamida et al. | 219/121 LB X |
| 4,670,639 | 6/1987 | Behn | 219/121 LT X |
| 4,701,591 | 10/1987 | Masaki et al. | 219/121 LS X |

FOREIGN PATENT DOCUMENTS

| | | | |
|---|---|---|---|
| 0062146 | 5/1977 | Japan | 219/121 LA |
| 0121249 | 9/1979 | Japan | 219/121 LT |

*Primary Examiner*—C. L. Albritton
*Attorney, Agent, or Firm*—Christie, Parker & Hale

[57] ABSTRACT

A method of producing a continuous seam weld between two mating surfaces of a can includes the steps of supplying a bolus of laser energy at alternate spaced locations along the line of the mating surfaces to effect local melting of the mating surfaces. The bolus of energy is then allowed to dissipate initially by way of an enlargement in the size of the melt pool and subsequently by cooling to a level at which the pool solidifies. A further bolus of laser energy is supplied at intervening spaced locations along the line of the mating surfaces to effect local melting of the mating surfaces. This bolus of energy is allowed to dissipate initially by way of an increase in the size of the melt pool and subsequently by cooling. The spacing between the alternate and intervening locations and the power of the bolus of energy being of such magnitude that the size of each pool produced at each intervening location during its enlargement overlaps a solidified pool.

26 Claims, 4 Drawing Sheets

CONTINUOUS SEAM WELDING APPARATUS AND METHODS

BACKGROUND OF THE INVENTION

1. Field of the Invention

The present invention relates to continuous seam welding.

2. Description of the Prior Art

It has been previously proposed to weld an elongate seam by means of a laser beam and in particular to weld the side seam of a tubular can body made of sheet metal such as steel, black plate or steels coated with a metal such as tin, chromium, nickel or zinc, or steels coated with layers of chromium and chromium oxide. The steel or other sheet material to be welded may have an organic coating.

In order to meet the commercial demand for welded cans it is desirable to weld can bodies at a rate in excess of 45 m/min. W M Steen and J Mazumder reported in the Welding Journal, June 1981, in an article entitled "The Laser Welding of Steels used in Can Making" that the welding of thin gauge steel (either coated or uncoated) was a possibility at speeds up to 7 or 8 m/min.

U.S. Pat. No. 4,315,132 (Saurin) describes a laser welding process which could weld cylinders at speeds up to 22 m/min but this process is not adaptable for use in the high speed welding of can bodies because high quality continuous wave (CW) laser welds cannot be consistently obtained at speeds above about 22 m/min regardless of laser power.

European Patent Application No. 0 143 450 (SWS Incorporated/Sharp) describes a method and apparatus for pulsed high energy density welding. This patent specification teaches that if a pulsed laser is used so that a series of overlapping pulses are laid down one after another then, because of the slight pause between consecutive pulses of the beam, the melt pool has time to stabilise. Welding can then proceed without the instability in the melt pool that occurs with a continuous power laser at speeds up to 40 m/min or more. This patent also gives an indication of the problems which beset the high speed welding of thin sheet metal and it indicates that the answer to high speed welding is not merely an increase in the power of the laser (this point is also made by Steen). Excessive power in the laser beam simply creates an unstable melt which may become a permanent hole if part of the melt is lost.

The problems which need to be alleviated are:
(a) the Sharp system only works at speeds up to 40 m/min because at greater speeds the melt becomes unstable and the weld is prone to such surface irregularities and undercutting as would be unacceptable in can making;
(b) the weld produced by a laser beam is narrow so any deviation of the butt joint, between the parts to be welding can result in the beam missing the joint completely or striking at an out of focus position:
(c) at high power levels there is a finite limit to the speed at which a laser can be pulsed: above this limited speed, a continuous laser beam may be used but problems (a) and (b) remain; and
(d) The intense localised energy of the laser beam and conductivity of the sheet metal to be joined give rise to rapid heating and cooling of the melt and risk of martensitic transformation.

Experience using such a welding process as Sharp's shows that there is a great difficulty in controlling the mechanical handling of the material to be welded at such high speeds. In addition at speeds in excess of about 45 m/min instability once again occurs in the melt pool and welding becomes impracticable.

In a paper entitled "The use of laser beam spinning to improve fit up and beam alignment tolerances when laser welding butt joints in sheet steel" by C J Dawes, published by the Welding Institute as Report 269; 1985 various methods to overcome some of these problems are described. Discussing the welding of metals, thicker than those used in the can industry, at speeds much lower than appropriate to can making three methods of manipulating the laser beam are described. In one method a spinning laser beam was used which if scaled up to the requirements of the can making industry would be required to spin at speeds presently considered impracticable for can making. In another method the laser beam was directed to follow an oscillating path spanning the butt joint but this required the beam to follow a long path length shown in FIG. 1 at D so slowing down the welding process. In a further method the beam was defocussed to a broader zone width but lesser intensity.

The Sharp patent showed that a way to increase speed was to allow the metal time to dissipate energy between welding pulses. However this has its limits in that if welding is fast enough there is insufficient time to cool down between welding pulses. In other words the practical effect is that there seems to be a limit to the amount of energy that can be pumped into the pieces to be welded over any particular time interval. We have discovered that this limit may be overcome by arranging for a series of non-overlapping weld pulses to be applied so that each weld pool has time to cool and possibly freeze before an overlapping pulse from a further, out-of-phase series, is applied. The longer the time lag between the first and subsequent adjacent weld pools the better. However, the time lag should not be too long in order to take advantage of the heat already supplied. By this means it should be possible to reach speeds of 100 m/min or more. The process does not have to be restricted to only two series of pulses, three or more could be used to fill the space between the welds formed by the first beam pulses.

SUMMARY OF THE INVENTION

According to the present invention there is provided a method of producing a continuous seam weld between two mating surfaces comprising the steps of supplying a bolus of energy at alternate spaced locations along the line of the mating surfaces to effect local melting of the mating surfaces, allowing the bolus of energy to dissipate initially by way of an enlargement in the size of the melt pool and subsequently by cooling to a level at which the pool solidifies, supplying a bolus of energy at intervening spaced locations along the line of the mating surfaces to effect local melting of the mating surfaces, and allowing the bolus of energy to dissipate initially by way of an increase in the size of the melt pool and subsequently by cooling, the spacing between the alternate and intervening locations and the power of the bolus of energy being of such magnitude that the size of each pool produced at each intervening location during its enlargement increases sufficiently to overlap a said solidifed pool.

According to the present invention there is further provided a method of producing a continuous seam weld between two mating surfaces, the method comprising the steps of applying a first succession of spaced discrete energy pulses to the mating surfaces progressively along the line of the seam to be formed, to effect local melting of the mating surfaces, applying a second succession of spaced discrete energy pulses progressively along said line also to effect local melting of the mating surfaces, the point of application of each pulse of the second succession being such that the pool of melt which it produces overlaps an area previously melted by a pulse of the first succession of pulses and the timing of each pulse of the second succession being such that it occurs during the period when the temperature of the said previously melted area has dropped by not less than 1% but not more than 25% of the temperature difference betwen the melting point of the material of the mating surfaces and ambient temperature.

According to the present invention there is still further provided a method of laser welding an elongate seam between seam materials said method comprising the steps of assembling the seam materials along the site of the eventual seam, causing relative motion as between the seam materials and a laser beam and controlling the delivery of laser energy to melt a plurality of overlapping zones, each zone being melted by a discrete pulse of laser energy characterised in that in the area of overlap between two zones a period of time elapses between the heating of the two zones sufficient to allow one said zone to stabilise or solidify before the other is melted.

According to the present invention there is yet further provided apparatus for producing a continuous seam weld between two mating surfaces the apparatus comprising means for supporting the mating surfaces and aligning them along a predetermined axis defining the site for the seam, means for effecting relative displacement between the laser means and the support means to cause the beam of the laser means to scan the site, and control means for controlling the laser means to direct successive discrete laser energy pulses to impinge upon the seam site to effect local melting of the mating surfaces in a series of overlapping zones the control means being effective to ensure that at least every alternative pair of pulses produced do not impinge upon respective zones which overlap each other.

According to the present invention there is still further provided a continuous seam weld between two mating surfaces and formed by local welding along a series of overlapping weld sites wherein the weld profile of the local weld produced at every alternate weld site overlaps and bridges the profiles of the local welds produced at every two adjacent intervening weld sites.

According to the present invention there is yet further provided a continuous seam provided by a succession of overlapping welding operations each over a generally circular site, the profile of the seam being such that each alternate weld is substantially circular and each intervening weld is substantially circular less the amount by which the or each adjacent alternate weld is in overlapping relationship with it.

BRIEF DESCRIPTION OF THE DRAWINGS

Various embodiments will now be described by way of example and with reference to the accompanying drawings in which.

DESCRIPTION OF THE PREFERRED EMBODIMENTS

Figure 1:
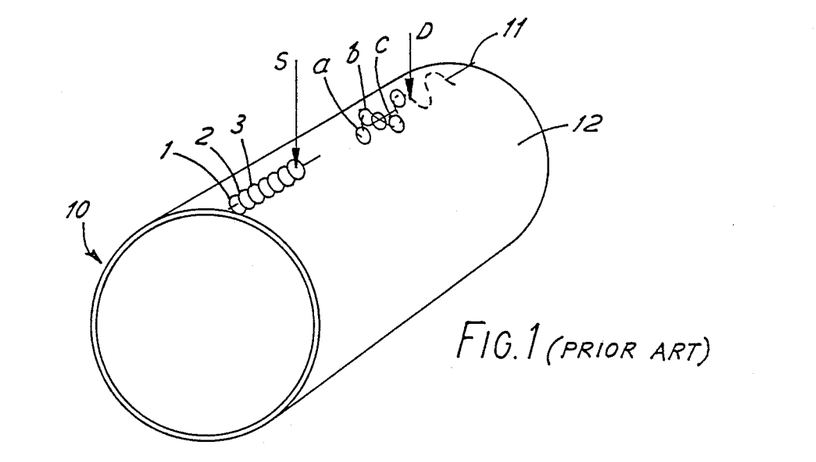
FIG. 1 is a perspective sketch of a tubular article having an elongate seam on which prior art patterns of the laser beam strike are shown diagrammatically.

In FIG. 1 a tubular article 10 has an elongate seam 11 defined by abutting edges of the side wall material 12. As shown in FIG. 1 the tubular article 10 is moved under either laser beam "S" or alternatively laser beam "D" to progressively produce a butt weld.

The laser beam "S" is operated in the manner and sequence taught in European patent application No. 0 143 450 so that, as the tubular article 10 moves at high speeds (22 to 40 m/s or more) under the pulsed laser beam "S" a plurality of overlapping spot welds 1, 2, 3 is formed. One problem arising with this form of welding is that, if the tubular article 10 twists as it travels the beam "S" will miss the abutting edges of the seam material 12.

In order to overcome this problem C J Dawes described methods in which a laser beam, denoted "D" in FIG. 1, is caused to oscillate to and fro across the abutting edges either to trace a wave as depicted or alternatively a looped trajectory (not shown in FIG. 1). A problem arising with these "weaving" or "spinning" beams is that the path traced out is lengthy and so the speed of welding is reduced.

Figure 2:
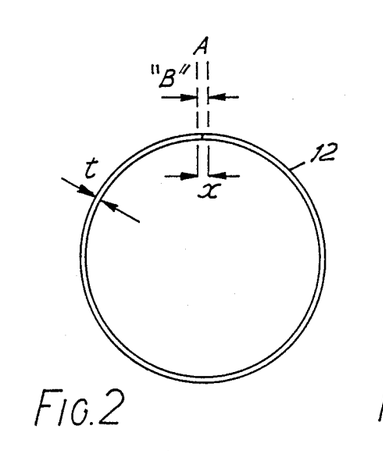
FIG. 2 is an end elevation of a tubular article having a butt jointed seam.

FIG. 2 shows a butt weld 13 and a laser beam A impinging on it. By way of example, a 1 kW "ELECTROX" (trade name) carbon dioxide laser could have a focussed beam of width "B" at the seam, in the range of from 0.1 mm to 0.15 mm (0.004 inch to 0.006 inch) so that if the tubular article twists a distance as little as 0.05 mm (0.002 inch) the beam A will miss the seam and an unsatisfactory weld 13 will be produced. Cans are currently made by welding cylindrical bodies formed from common sheet metals 12 of thickness "t" in the range of from 0.15 mm to 0.4 mm (0.006 inch to 0.016 inch). When using thin sheet metals such as tinplate blackplate or chromium/chromium oxide coated steels the dimensional tolerance in the location of the seam is difficult to maintain. Similar problems will arise when welding steels coated with nickel or zinc.

Figure 3:
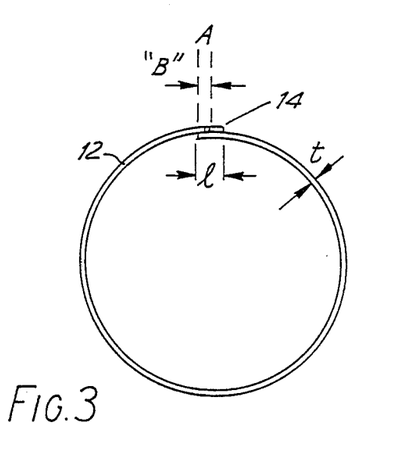
FIG. 3 is an end elevation of a tubular article having a lap jointed seam.

FIG. 3 shows a tubular article having a lap seam 14 and a laser beam A impinging on the overlapping seam material 12. Early welded cans had an overlap "1" of about 3 mm but more recently this was reduced to 0.8 mm. However, in both cases the overlap exceeds the width "B" of the laser beam so the lap seam is a much easier target for a laser beam to hit. However, the lap seam is not preferred for can making because of the risk of corrosion in the crevice between the overlapping layers.

Figure 4:
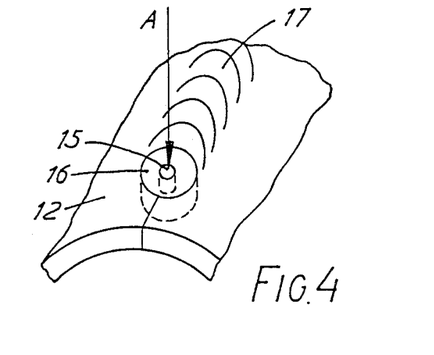
FIG. 4 is a fragmentary view of a seam during laser welding.

FIG. 4 illustrates the distribution of the laser beam energy from a laser beam "A" into the melt pool via a keyhole 15 and thence into a heated zone 16 from which it is drawn by the "heat sink" effect of the seam material 12 and to a lesser extent into the newly created weld 17 made up of previous strikes.

The cooling rates arising at a strike zone can be as much as $10^{6°}$ C./sec so that during welding of ferrous materials, martensite may be formed. As martensite is harder than the ferritic sheet metal, a weld having a martensitic structure represents a discontinuity of structure that may give rise to difficulty during the subsequent spinning or roll forming of a shoulder neck and flange on the welded cylinder. It is therefore desirable to abate the rapid cooling that causes the martensitic transformation so that a ferritic weld 17, properly centred in the seam material 12 is produced as shown in FIG. 5.

Figure 5:
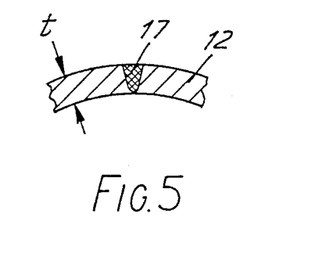
FIG. 5 is a fragmentary section through a desired form of butt weld.

It will be noted that in FIG. 5 the weld, about 0.4 mm wide, penetrates the thickness of the seam metal 12 without protruding. The degree of penetration is to some extent governed by the power of the laser beam used and the speed of travel of the beam across the seam. Typically a laser beam having an average density of at least $155 \times 10^9$ W/m$^2$ ($10^6$ watts/inch$^2$) is used, such as can be provided by a carbon dioxide laser. However a dilemma arises because a high power laser is best able to deliver power quickly for rapid progression of the weld but high powered lasers (e.g. 3 Kilowatt) are capable of producing an unstable melt pool 15 which may collapse to leave a void or move to freeze as a protrusion or "stub".

Figure 6:
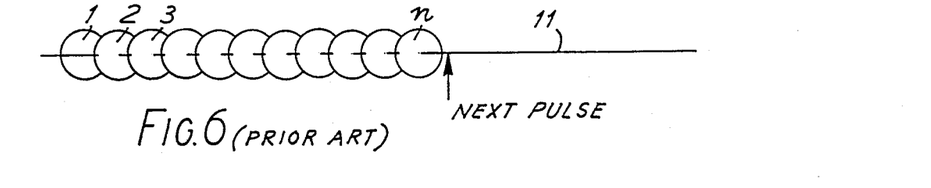
FIG. 6 is a diagrammatic view of the prior art sequence of laser strikes also shown in FIG. 1.

FIG. 6 reproduces a prior art weld sequence produced by laser beam S of FIG. 1 in a simple geometrical plan form. As can be seen each pulse of laser energy partially overlaps the previously heated zone to achieve a continuous weld from the succession of pulse induced spot welds. The arrow denotes the next pulse strike location.

Figure 7:
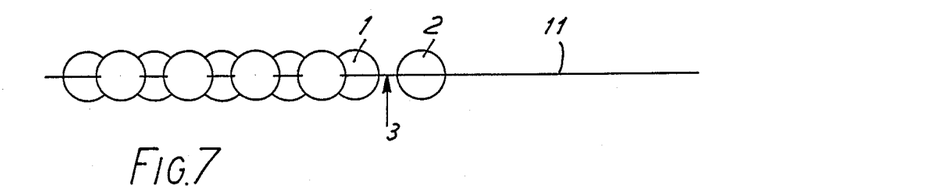
FIGS. 7 to 13 are diagrammatic views of the sequence of laser strikes embodying the present invention.

By way of contrast a first embodiment of the method embodying the invention is shown in FIG. 7. In FIG. 7 the finished weld pattern is similar to that of FIG. 6 but it will be seen that before overlaying the overlapping strike (3) as arrowed, a pulse strike (2) is delivered one pitch ahead so that zone of the previous strike (1) has time to cool and start to stabilise before it is overlapped by the pulse strike (3), i.e. in FIG. 7 the pulse denoted 1 has time to cool while pulse 2 is laid ahead of it before an additional pulse 3 is overlaid upon it.

Each circle drawn in FIG. 7 represents a heated zone as described with reference to FIG. 4. As more heat is added then when an additional pulse overlaps a previous zone of heating it is possible to control the amount of heat introduced by increasing the amount of overlap.

Figure 8:
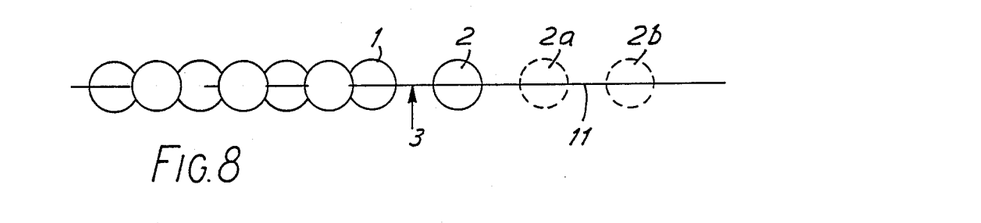

FIG. 8 shows how the amount of heat applied to each zone can be decreased by reducing the amount of overlap as will be understood by comparison with FIG. 7. Again the area heated by pulse 1 must have time to cool before the next pulse 3 is overlaid upon it. Whilst pulse 2 is shown as being applied one pitch ahead, it may, if desired be placed even further ahead as shown by the dashed circles 2a or 2b. A benefit of applying the distant strikes 2a or 2b is that they make a spot weld which holds the seam steady for final welding.

The pulse required to produce the zone 2 may be delivered by redirecting the beam from a single laser used to provide the pulse for zone 1 or alternatively a separate laser may be used to provide pulses for heating the zones denoted 1, 2a or 2b.

Figure 9:
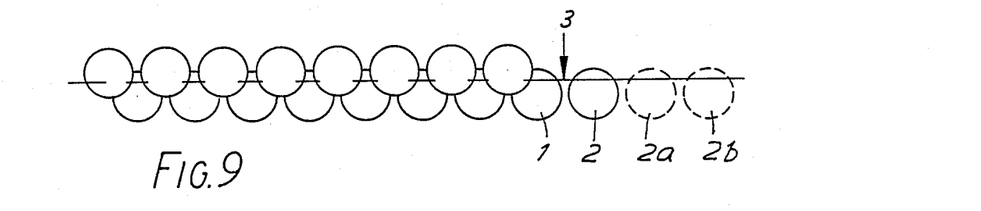

The patterns of FIGS. 7 and 8 rely on a laser beam of adequate width to span any tolerable deviation of the seam 11. FIG. 9 shows a pattern of pulse strikes which increases the width of material heated by use of a staggered array of pulse strike zones. In FIG. 9 a pulse strike zone 2 is laid ahead of a previous strike zone 1 before an additional pulse strike 3 is applied the pulse strikes 1 and 2 are centred to one side of the seam line 11 and the pulse strike 3 is about to be applied to the other side of the seam line 11 so that a double row of overlapping zones is progressively laid. The distant strikes 1a, 2b in FIG. 9 show again that there is some design choice as to the degree of prefixing and thermal control.

Figure 10:
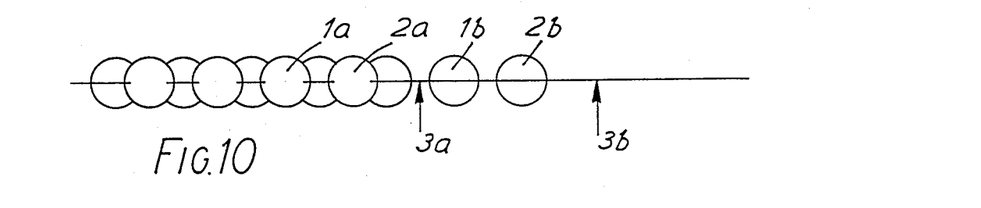

FIG. 10 is presented to show that a pair of pulses may be applied simultaneously so that in FIG. 10 a first pair of pulses 1a, 1b is applied and has time to cool and stabilise while a second pair of pulses 2a, 2b is applied so that when the third pair of pulses 3a, 3b are applied the rate of cooling of pulses 1a is controlled.

Figure 11:
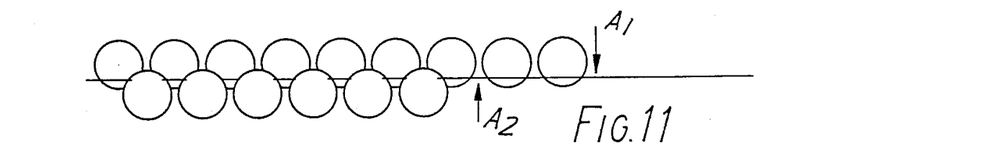

FIG. 11 shows how a staggered array of zones, centred on the seam line may be progressively developed using a pair of laser beams. A first laser beam $A_1$ has created the top row of zones and is shown in the leading position in readiness for a next strike. A second laser beam $A_2$ has created the lower row of zones and is shown in the position for its next strike at which the pulse delivered will overlay the two adjacent zones created by the laser $A_1$. Thus the zones in the row created by laser $A_1$ have time to stabilise before being struck by pulses from laser $A_2$.

Figure 12:
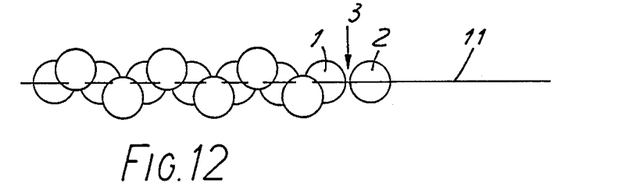

FIG. 12 shows a pattern of zones laid along a wave form as proposed by Dawes in the prior art but, as in FIG. 7, there is a delay in time between the pulse striking zone 1 and being struck by an additional pulse 3 during which period the zone 2 is irradiated. The zone 1 is therefore able to stabilise before being restruck. The pattern shown in FIG. 12 may be made by use of two laser beams, one of which deflects from side to side across the seam 11 and the other of which fills in the overlap zones: in which case the sequence will not be as shown in FIG. 12.

Figure 13:
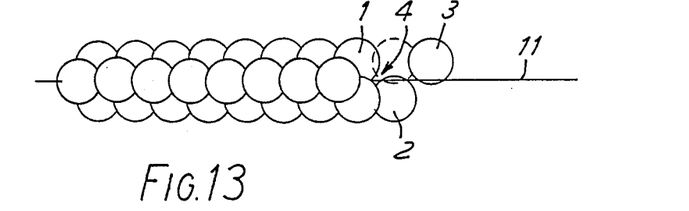

FIG. 13 shows a pattern of heated zones comprising three rows: one row centred on the seam line 11 and a row centred on each side of the seam line but encompassing the seam line 11. It will be seen that the overlapping zones of the outer rows and centre melt zones of the central row progressively make a nearly continuous band of irradiation greater in width than would be achieved by a single laser beam. Also the triple zone pattern provides heat laterally of the weld so abating the heat sink effect of the cold metal to each side of it. To a lesser extent the double zone patterns of FIGS. 9 and 11 yield a similar benefit.

The pattern shown in FIG. 13 can be achieved by deflecting a single laser beam to the zone positions 1, 2, 3, 4 as shown. However it may be move convenient to use a first laser beam oscillating across the seam line 11 to heat zones 1 and 2 and 3 whilst a second laser beam fills in the centre row at an appropriate later time. Instead three separate lasers could be used each timed to fire at the appropriate time to create a spaced array of zones which is finally completed but this would be costly.

To recapitulate: the patterns of FIGS. 7 to 13 all allow each melt pool to stabilise before its peripheral zone is restruck by an adjacent zone. The patterns of FIGS. 9, 11, 12 and 13 increase the amount of heat to each side of the seam line so reducing the heat sink effect of the seam material giving an opportunity to prevent martensitic transormations and possibly more importantly permitting relaxation of the tolerance on location of the seam line under the or each beam.

In the embodiments of the apparatus for performing the invention as will now be described the apparatus of FIGS. 14 to 18 is shown to effect a distribution of the zones along the line of the seam while a lateral distribution of zones is effected by the apparatus of FIGS. 9, 11, 12 and 13.

Figure 14:
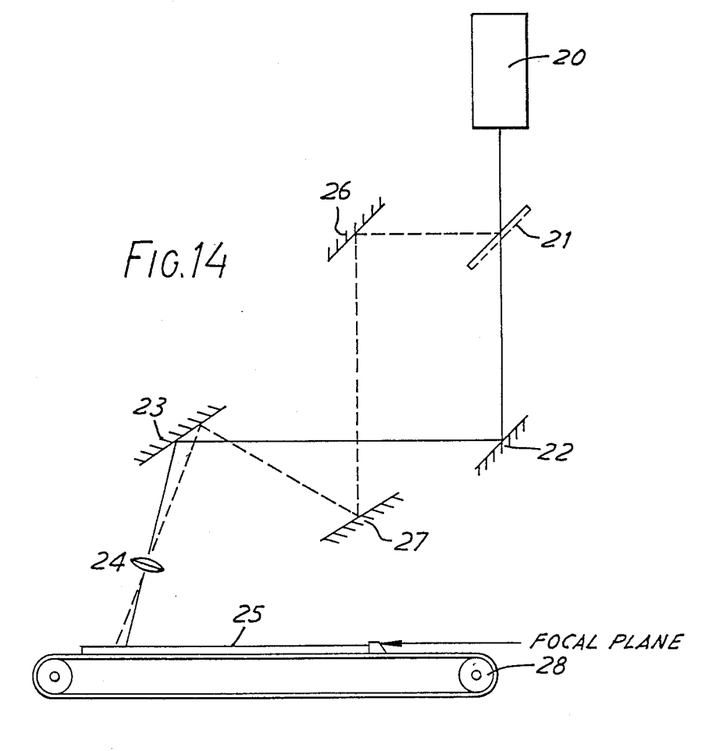
FIG. 14 is a diagrammatic representation of a first embodiment of apparatus for effecting the sequence of FIGS. 7 to 12.

FIG. 14 shows a first embodiment of apparatus for welding an elongate seam according to the sequence described with reference to FIGS. 7, 8 and 11 and adaptable, by slewing the conveyor, to make the seams of FIGS. 9 and 11.

The apparatus shown in FIG. 14 comprises a 2 Kw carbon dioxide laser 20 emitting a continuous beam which is directed on to a reflecting chopper 21 in the form of rotating blades. A laser beam when not intercepted by the blades, impinges upon a first fixed mirror 22 which reflects it, on to a second fixed mirror 23 which redirects the beam through a lens 24 on to the workpiece 25 which is located in the focal plane of lens 24.

Figure 15:
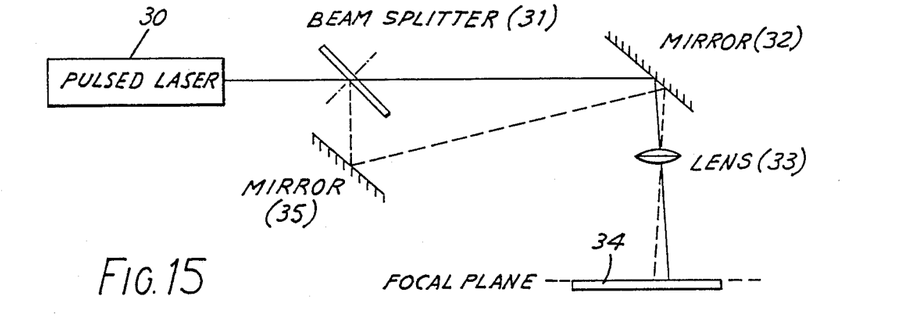
FIG. 15 shows diagrammatically a second embodiment of apparatus for effecting the sequence of FIGS. 7 to 12.

When the beam is intercepted by or strikes a blade of the reflecting chopper 21 it is directed on to a third mirror 26 which passes the chopped beam (denoted by dashed lines) to a fourth mirror from where the beam is redirected on to the mirror 23. The beam when reflected by the mirror 23 passes through the lens 24 on to the workpiece 25 at a desired distance apart from the point of strike by the beam not intercepted by the chopper. The apparatus of FIG. 14 is therefore able to apply a series of pulse strikes each at a location set apart from the next. As the workpiece is conveyed by the conveying means 28 to pass across the beams, the desired pattern of strikes by each pulse is delivered. Each pulse has time to stabilise before being partially restruck. The apparatus of FIG. 14 creates two intermittent beams spaced apart. Each beam delivers energy only when the other is not doing so. FIG. 15 shows a second embodiment of apparatus suitable for use in creating the sequence of strikes as shown in FIGS. 7 to 11. In FIG. 15 the apparatus comprises a pulsed laser 30 from which the pulsed beam is directed on to a stationary beam splitter 31 which splits the beam into two beams one of which passes directly to a mirror 32 for reflection through a lens 33 on to a workpiece 34 located in the focal plane of lens 33. The second beam (shown by dashed lines) is deflected from the splitter 31 to strike a second mirror 35 which reflects the second beam on to mirror 32. The mirror 32 reflects the second beam through the lens 33 to be focussed on the workpiece 34 in a zone at a distance apart from the zone heated by the first beam. In the apparatus of FIG. 15 two simultaneous beams are created: any pulsing arises because a pulsed laser was chosen.

A zinc selenium beam splitter with appropriate surface coatings may be used. The ratio of beam intensity may be varied by choice of an appropriate splitter, for example a 50:50 ratio of first beam intensity to second beam intensity can be selected. Alternatively a 70:30 ratio can be selected. With the latter alternative the reduced intensity beam "30" is useful if there is a risk of injecting too much heat in a pattern location such as the trailing edge of zone 2 in FIG. 7 or the centre line zones "4" of FIG. 13.

If the desired zone pattern requires more beams another splitter may be added, for example after the first splitter on the main beam.

Figure 16:
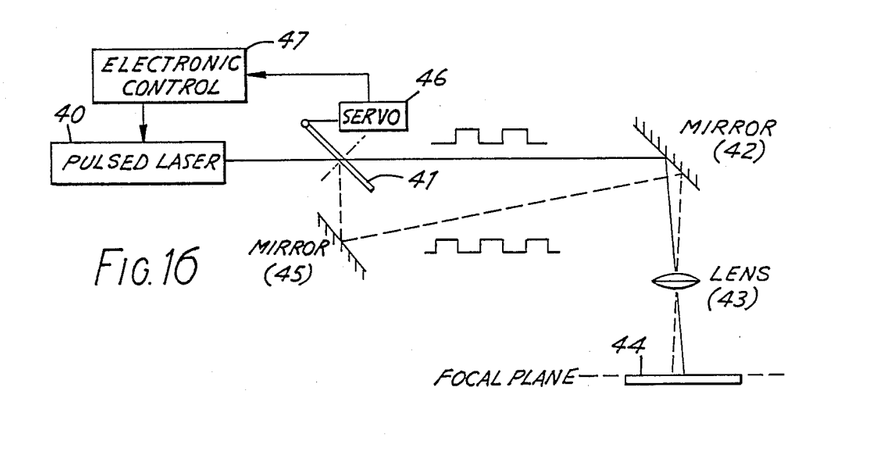
FIG. 16 shows diagrammatically a third embodiment of apparatus for effecting the sequence of FIGS. 7 to 12.

FIG. 16 shows a third embodiment of apparatus for welding an elongate seam. In FIG. 16 the apparatus comprises a laser 40 (which may be pulsed or continuous), a chopper 41 which receives the beam from the laser 40 and passes it on each alternate occasion to a mirror 42 and lens 43 which focusses it on a workpiece 44 and on each intervening occasion to a second mirror 45 which directs the beam on to mirror 42 for focussing by the lens 43 on to the workpiece.

In FIG. 16 the chopper 41 is connected to a servo controlled device 46 which is electronically controlled by means 47 so that the chopping action by the chopper 41 is synchronised with the laser pulses if pulsed laser is used.

As shown by the pulse graphs adjacent each beam the pulses of each beam are phase displaced so that when one beam is delivering power the other is not. The intensity of each beam may be varied, as either by controlling the laser or alternatively by choice of an appropriate chopper.

Figure 17:
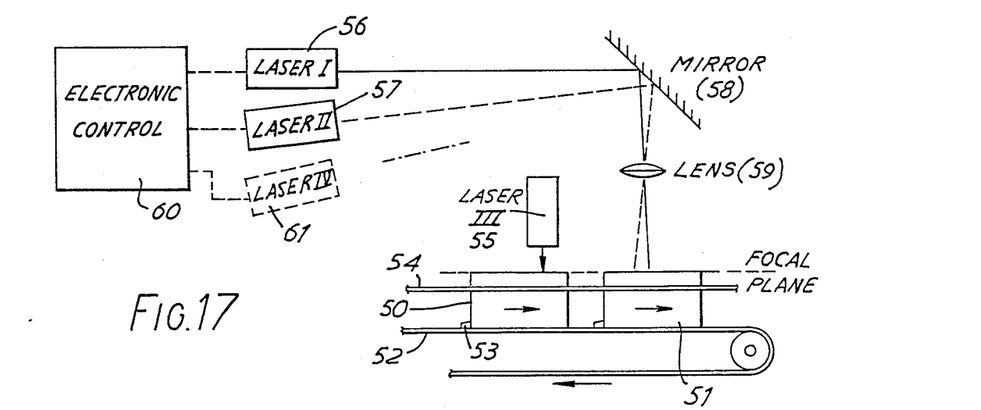
FIG. 17 shows diagrammatically a fourth embodiment of the apparatus for effecting the sequence of patterns of FIGS. 7 to 13.

FIG. 17 shows a fourth embodiment of the apparatus for use in welding cylindrical can bodies 50, 51 having a butt seam uppermost to receive a plurality of laser beams. A conveyor 52 has spaced drive dogs 53 which drive the can bodies 50, 51 within the restraint of guide means for example guide rails 54. As in the previous examples the seam is substantially in the focal plane of a lens 59 which focusses the laser beams received from a mirror 58.

In contrast to the previously described examples of apparatus FIG. 17 shows a separate laser used to provide each beam. A first laser 55 of relatively low power and located upstream of the lens 59, directs its beam on to the seam material as the can body 50 is conveyed beneath it (from left to right in FIG. 17). The beam from the laser 55 serves to volatilise any coating materials on the seam margins adjacent the butt joint. As can coatings are usually inorganic pigments in an organic vehicle the heat acts to drive off the carbon bearing organic polymers in order to prevent carbon reaching the subsequent melt pool. Should it be found that any particular can coating chars or stubbornly adheres it may be brushed off by a rotating brush (not shown).

The cleaned can 51 is depicted during welding. Depending on the laser power used for edge cleaning of the butt seam it may still have useful preheat so that less power is required at the welding station.

As shown the can body 51 is receiving irradiation from two lasers 56 and 57. The beam from each of the two lasers 56 and 57 is delivered to the can body 51 via a mirror 58 and a lens 59 of focal length such that the seam is substantially in the focal plane of the lens as previously explained.

The lasers 56 and 57 are timed by control means 60 to direct their pulses so that one of the patterns of FIGS. 7 to 13 is developed at the seam as the can body moves across the beams.

If required a fourth laser 61 (shown in broken lines) may be included to facilitate the formation of a pattern requiring a triple row of heated zones such as shown in FIG. 13. Alternatively this optional third laser may be used for edge cleaning or preheating to adjust the heat distribution in the weld.

If desired a further beam may be directed to heat the weld after the formation in order to further control the rate of cooling for example prevent martensitic transformations or perform some degree of annealing or normalising of the welding structure.

The various features of the apparatus described may be transposed as desired to achieve useful results without exceeding the scope of the invention. For example, the lasers 56 and 61 of FIG. 17 could be directed at the can without the mirror 58.

It will be appreciated that with the methods described where a continuous seam is produced by creating overlapping melt zones it is important to allow each melt zone to cool (to dissipate energy) before an overlapping portion is remelted.

It is preferable that each zone should cool to below the freezing point of the material before a reheating is effected. However with high speed welding where one zone is often caused to overlap with two others this is not always possible if high speeds are to be maintained. As a compromise therefore at least one of the two zones to be partially remelted should have cooled to below freezing before being partially remelted. Advantageously that zone should have cooled by not less than 1% and not more than 25% of the temperature difference between the melting point of the seam materials and the ambient temperature. Preferably this range should be between 5 and 15%.

While the description has been directed to producing a continuous seam weld in ferrous materials, it will of course be apprecaited that any other materials including other metals and even plastics materials can be welded in a similar manner.

While the presently preferred embodiments of the present invention have been illustrated and described, modifications and variations thereof will be apparent to those skilled in the art given the teachings herein, and it is intended that all such modifications and variations be encompassed within the scope of the appended claims.

I claim:

1. A method of producing a continuous seam weld between two mating surfaces during the passage of the surfaces relative to an energy source in a single pass, the method comprising the steps of
    supplying a bolus of energy from said energy source at alternate spaced locations along the line of the mating surfaces to effect local melting of the mating surfaces to form melt pools,
    allowing the bolus of energy to dissipate initially by way of an enlargement in the size of the melt pool and subsequently by cooling to a level at which the pool solidifies,
    supplying the bolus of energy from said energy source at intervening spaced locations along the line of the mating surfaces to effect local melting of the mating surfaces, and
    allowing the bolus of energy to dissipate initially by way of an increase in the size of the melt pool and subsequently by cooling, the spacing between the alternate and intervening locations and the power of the bolus of energy being of such magnitude that each pool produced at each intervening location increases in size sufficiently to overlap of said solidified pool at a said alternate location.

2. A method acording to claim 1 wherein the timing of the application of each bolus of energy at a said intervening location is such that it occurs when the temperature of the solidified pool with which it overlaps has dropped below the melting point of the material of the mating surfaces by not less than 1% and not more than 255 of the temperature difference between the melting point of the material of the mating surfaces and ambient temperature.

3. A method according to claim 1 wherein the timing of the application of each bolus of energy at a said intervening location is such that it occurs when the temperature of the solidified pool with which it overlaps has dropped below the melting point of the material of the mating surfaces by not less than 5% and not more than 15% of the temperature difference between the melting point of the material of the mating surfaces and ambient temperatures.

4. Apparatus for producing a continuous seam weld between two mating surfaces, the apparatus comprising
    laser means energisable to produce a laser beam,
    means for supporting the mating surfaces and aligning them along a predetermined axis defining the site for the seam,
    means for effecting relative displacement between the laser means and the support means to cause the beam of the laser means to scan the site, and
    control means for controlling the laser means to direct successive discrete laser energy pulses to impinge upon the seam site to effect local melting of the mating surfaces in a series of overlapping zones, the control means being effective to ensure that at least every alternate pair of pulses produced do not impinge upon respective zones which overlap each other,
    wherein the control means causes each alternate pulse to be centred on a first axis extending parallel to and lying to one side of the central axis of the same and causes each alternate pulse to be centred on a second axis extending parallel to and lying to the other side of the central axis of the seam.

5. A method of producing a continuous seam weld between two mating surfaces, the method comprising the steps of
    applying a first succession of spaced discrete energy pulses to the mating surfaces progressively along the line of the seam to be formed, to effect local melting into melt pools of the mating surfaces,
    applying a second succession of spaced discrete energy pulses progressively along said line also to effect local melting into melt pools of the mating surfaces, the point of application of each pulse of the second succession being such that the pool of melt which it produces overlaps an area previously melted by a pulse of the first succession of pulses and the timing of each pulse of the second succession being such that it occurs during the period when the temperature of the said previously melted area has dropped by not less than 1% but not more than 25% of the temperature difference between the melting point of the material of the mating surfaces and ambient temperature.

6. A method according to claim 5 wherein the timing of each pulse of said second succession occurs during the period when the temperature of the said previously melted area has dropped by not less that 5% but not more than 15% of the temperature difference between the melting point of the material of the mating surfaces and ambient temperature.

7. A method according to claim 5 wherein each energy pulse of the second succession is arranged to overlap two adjacent pools of melt produced during said first succession of energy pulses.

8. A method according to claim 5 wherein said discrete energy pulses or each said bolus of energy is supplied by a laser.

9. A method of welding an elongate seam between seam materials using a laser beam, said method comprising the steps of
assembling the seam material along the site of the eventual seam,
causing relative motion as between the seam materials and the laser beam, and
controlling the delivery of laser energy during a single pass between the laser beam and the seam materials to melt a plurality of overlapping zones, of the seam materials along the site of the eventual seam, each zone being melted by a discrete pulse of laser energy characterised in that in the area of overlap between two zones a period of time elapses between the heating of the two zones sufficient to allow one said zone to stabilise or solidify before the other is melted.

10. A method according to claim 9 wherein during eh period when a pulse of laser energy heats a zone overlapping two solidified or stabilised zones, a further pulse is directed to strike a zone on the site of the seam at a location spaced from said two solidified or stabilised zones.

11. A method according to claim 10 wherein the said location is spaced from the closest one of said two solidified or stabilised zones by at least the width of one zone in the direction of the seam.

12. A method according to claim 10 wherein the said two solidified or stabilised zones are centred on the central axis of the site for the seam.

13. A method according to claim 10 wherein the said two solidified or stabilised zones are centred on a line inclined to the central axis of the site for the seam.

14. A method according to claim 13 wherein where one zone overlaps two others, the three zones in question are centred on a line inclined to the central axis of the site for the seam and the central zone is centred on the central axis.

15. A method according to claim 9 wherein the site for the seam is preheated.

16. Welding apparatus for producing a continuous seam weld between two mating surfaces the apparatus comprising
laser means energisable to produce a laser beam,
means for bringing together and supporting the mating surfaces and aligning them along a predetermined axis defining the site for the seam,
means for effecting relative displacement between the laser means and the support means to cause the beam of the laser means to scan the site, and
control means for controlling the laser means to direct successive discrete laser energy pulses to impinge upon the seam site to effect local melting of the mating surfaces in a series of overlapping zones the control means being effective to ensure that at least every alternative pair of pulses produced do not impinge upon respective zones which overlap each other and that the welding operation is completed in a single pass.

17. Apparatus according to claim 16 wherein the control means if effective to ensure that every intervening pair of pulses produced do not impinge upon respective zones which overlap each other.

18. Apparatus according to claim 16 wherein the control means causes each alternate pulse to be centred on a first axis extending parallel to and lying to one side of the central axis of the seam and causes each alternate pulse to be centred on a second axis extending parallel to and lying to the other side of the central axis of the seam.

19. Apparatus according to claim 16 wherein the control means causes each alternate pulse to be centred on a central axis of the seam and causes the odd ones of each intervening pulse to be centred on a first axis extending parallel to and lying on one side of the central axis and the even ones of each intervening pulse to be centred on a second axis extending parallel to and lying on the other side of said central axis.

20. Apparatus according to claim 16 wherein the laser means comprises a continuous beam laser and wherein the control means comprises a chopper for periodically deflecting the laser beam from a first path to a second path, each alternate pulse being directed to said seam site along said first path and each intervening pulse being directed to the seam site along said second path.

21. Apparatus according to claim 16 wherein said laser means comprises a pulsed beam laser and wherein said control means comprises a beam splitter for directing pairs of pulses along separate paths towards said seam site.

22. Apparatus according to claim 16 wherein said laser means comprises a pulsed laser and said control means comprises a chopper for deflecting each alternate pulse along a first path to said seam site and each intervening pulse along a second path to said seam site, the chopper being synchronised with said pulsed laser so that the chopper is active to change between paths only during the intervals between pulses.

23. Apparatus according to claim 16 wherein the laser means comprises a first laser having its beam directed at said seam site along a first path and a second laser having its beam directed at said seam site along a second path, and wherein the control means is operative to cause the first and second lasers to produce pulses of energy alternately.

24. Apparatus according to claim 16 including lens means for focussing the laser beam or beams on to the seam site.

25. Apparatus according to claim 16 including means for preheating the seam site prior to the impact of said laser energy pulses.

26. Apparatus for producing a continuous seam weld between two mating surfaces, the apparatus comprising
laser means energisable to produce a laser beam,
means for supporting the mating surfaces and aligning them along a predetermined axis defining the site for the seam,
means for effecting relative displacement between the laser means and the support means to cause the beam of the laser means to scan the site, and
control means for controlling the laser means to direct successive discrete laser energy pulses to impinge upon the seam site to effect local melting of the mating surfaces in a series of overlapping zones, the control means being effective to ensure that at least every alternate pair of pulses produced do not impinge upon respective zones which overlap each other, wherein the control means causes each alternate pulse to be centred on an central axis of the seam and causes the odd ones of each intervening pulse to be centred on a first axis extending to and lying on one side of the central axis and the even ones of each intervening pulse to be centred on a second axis extending parallel to and lying on the other side of said central axis.

* * * * *

UNITED STATES PATENT AND TRADEMARK OFFICE
CERTIFICATE OF CORRECTION

PATENT NO.  : 4,857,697

DATED       : August 15, 1989

INVENTOR(S) : Martin J. Melville

It is certified that error appears in the above-identified patent and that said Letters Patent is hereby corrected as shown below:

In the Specification:

Column 1, line 20, change "W M Steen" to -- W. M. Steen --.
Column 1, line 57, change "welding" to -- welded --.

Column 2, line 7, change "C J Dawes" to -- C. J. Dawes --.
Column 2, line 8, after "1985" insert a comma.

Column 4, line 42, change "C J Dawes" to -- C. J. Dawes --.

Column 5, line 36, change "Kilowatt" to -- kilowatt --.

Column 6, line 64, change "move" to -- more --.

Column 7, line 10, change "transormations" to
         -- transformations --.
Column 7, line 24, change "Kw" to -- kw --.

Column 8, line 42, after "apparatus" insert a comma.

UNITED STATES PATENT AND TRADEMARK OFFICE
CERTIFICATE OF CORRECTION

PATENT NO. : 4,857,697

DATED : August 15, 1989

INVENTOR(S) : Martin J. Melville

It is certified that error appears in the above-identified patent and that said Letters Patent is hereby corrected as shown below:

In the Claims

Column 10, line 9, change "225" to -- 25% --.
Column 10, line 68, change "that" to -- than --.

Column 11, line 29, change "eh" to -- the --.

Column 12, line 4, change "if" to -- is --.

Column 13, line 5, change "an" to -- a --.

Signed and Sealed this

Twenty-third Day of October, 1990

Attest:

HARRY F. MANBECK, JR.

*Attesting Officer*     *Commissioner of Patents and Trademarks*